United States Patent
Gooding et al.

[11] Patent Number: 5,273,338
[45] Date of Patent: Dec. 28, 1993

[54] BULBOUS WINDOW MOLDING

[75] Inventors: Roger C. Gooding, Shelby Township, Macomb County; Raymond F. Kraemer, Fraser; Mary C. Stenroos, Holland, all of Mich.

[73] Assignee: General Motors Corporation, Detroit, Mich.

[21] Appl. No.: 899,080

[22] Filed: Jun. 15, 1992

[51] Int. Cl.[5] .................................................. B60J 10/02
[52] U.S. Cl. .................................. 296/146.15; 296/93; 52/208; 52/400
[58] Field of Search ................ 296/93, 146 M, 201; 52/208, 397, 400, 403; 49/498

[56] References Cited

U.S. PATENT DOCUMENTS

| | | | |
|---|---|---|---|
| 1,604,760 | 10/1926 | Simpson | 296/93 |
| 2,263,806 | 11/1941 | Hammerl | 49/498 |
| 2,700,196 | 1/1955 | Panhard | 296/93 X |
| 2,908,949 | 10/1959 | Frehse . | |
| 2,935,771 | 5/1960 | Hatcher | 49/498 X |
| 2,989,338 | 6/1961 | Hezler | 296/93 |
| 3,025,576 | 3/1962 | Herman . | |
| 3,178,778 | 4/1965 | Reahard | 49/498.1 |
| 3,714,751 | 2/1973 | Lackey | 52/400 |
| 4,259,823 | 4/1981 | Hellriegel | 52/400 |
| 4,441,755 | 4/1984 | Endo et al. | 296/93 |
| 4,505,511 | 3/1985 | Hanle | 296/93 |
| 4,765,673 | 8/1988 | Frabotta et al. | 296/93 |
| 4,833,847 | 5/1989 | Inayama et al. | 52/208 |
| 5,009,462 | 4/1991 | Katcherian | 296/201 |
| 5,035,459 | 7/1991 | Yada | 296/93 |
| 5,056,850 | 10/1991 | Katcherian et al. | 296/93 |
| 5,112,101 | 5/1992 | Katcherian et al. | 296/201 |

FOREIGN PATENT DOCUMENTS

| | | | |
|---|---|---|---|
| 3227450 | 2/1983 | Fed. Rep. of Germany | 296/146 |
| 2564691 | 11/1985 | France | 296/201 |

*Primary Examiner*—Dennis H. Pedder
*Attorney, Agent, or Firm*—William A. Schuetz

[57] ABSTRACT

A motor vehicle window molding installation has a molding for concealing a space between an inwardly extending wall of a flanged vehicle body panel and an edge of a window panel. The edge of the window panel overlies a parallel extended wall which intersects the inwardly extending wall of the flanged vehicle body panel and mounts on the parallel extended wall of the flanged vehicle body panel by a curable adhesive. The molding has a rigid high durometer plastic material portion having a C-shaped channel section including spaced apart legs which forcibly grip the opposed faces of the window panel and a base wall connecting the legs. A pliable low durometer plastic material portion is co-extruded with the rigid portion. The pliable portion has a web including a pair of ends which bond to the rigid portion. The web and the rigid portion form a bulbous tubular portion for engaging the inwardly extending wall of the vehicle body panel. The rigid portion has a rib extending between the base wall of the C-shaped channel section and the web which partitions the bulbous tubular portion and biases the web into engagement with the flanged vehicle body panel whereby the web conceals the space between the flanged vehicle body panel and the edge of the window panel.

6 Claims, 1 Drawing Sheet

BULBOUS WINDOW MOLDING

BACKGROUND OF THE INVENTION

1. Field of the Invention

This invention relates to a window molding for a motor vehicle and more particularly to a window molding that conceals the space between the vehicle body structure and the window panel 2. Description of the Relevant Art It is known to conceal the space between a window panel and a vehicle body panel by use of a metal molding which bridges the space and is attached to the vehicle body by a plurality of clips spaced along the length of the molding and engaged on studs welded to the body panel.

It is also known to provide a plastic extruded molding having a decorative trim portion which overlies the window panel and the body panel and is inserted into a bead of curable adhesive to attach the molding to the body panel and the glass. An example of such a window reveal molding includes U.S. Pat. No. 4,165,119, Hedeen et al., "Window Reveal Molding".

The decorative trim portion of the extruded plastic molding is retained in engagement with the window panel and the body panel by the resilience of the plastic material of the molding However, in some circumstances the decorative trim portion overlying the body panel may become separated slightly from the body panel due to an aberration in the installation or due to some distortion of the molding. Should the decorative trim portion become separated and spaced somewhat from the body panel, the air stream flow over the vehicle body creates a venturi-like effect with respect to the air space between the molding and the body panel which creates a noise.

It is known to have a foam rubber strip which attaches to the molding and underlies a lip of the molding for engaging the body panel for sealing the space between the window panel and the vehicle body panel to block the space between the molding and the body panel.

It would be desirable to have a window molding having a pliable web for sealingly engaging the body panel for concealing the space between the vehicle body panel and the edge of the window panel and a rigid rib of the molding bonded to the web for ensuring the engagement of the web with the body panel while minimizing the presence of the molding.

SUMMARY OF THE INVENTION

A motor vehicle window molding installation has a molding for concealing a space between an inwardly extending wall of a flanged vehicle body panel and an edge of a window panel. The edge of the window panel overlies a parallel extended wall which intersects the inwardly extending wall of the flanged vehicle body panel. The window mounts on the parallel extended wall of the flanged vehicle body panel by a curable adhesive. The molding has a rigid high durometer plastic material portion having a C-shaped channel section including spaced apart legs which forcibly grip the opposed faces of the window panel and a base wall connecting the legs. A pliable low durometer plastic material portion is co-extruded with the rigid portion The pliable portion has a web including a pair of ends bonded to the rigid portion. The web and the rigid portion form a bulbous tubular portion for engaging the inwardly extending wall of the vehicle body panel. The rigid portion has a rib extending between the base wall of the C-shaped channel section and the web which partitions the bulbous tubular portion and biases the web into engagement with the flanged vehicle body panel whereby the web conceals the space between the flanged vehicle body panel and the edge of the window panel.

One object, feature and advantage resides in the provision of a dual durometer molding having a rigid portion including a C-shaped channel for engaging the window panel, and the molding having a pliable web portion bonded to the rigid portion forming a bulbous tubular section for sealingly engaging the flanged vehicle body panel and the molding having a rib which extends from the base of the C-shaped channel and bonds to the web for partitioning the bulbous tubular portion and biasing the bulbous tubular portion into engagement with the body panel.

Another object, feature and advantage resides in the provision of the dual durometer molding having a bulbous tubular portion for sealingly engaging with the flanged vehicle panel while minimizing the presence of the molding.

Another object, feature and advantage resides in the provision of the rib of the rigid portion biasing the bulbous tubular portion into engagement with the body panel thereby centering the window panel in the window opening.

Further objects, features and advantages of the present invention will become more apparent to those skilled in the art as the nature of the invention is better understood from the accompanying drawings and detailed description.

DESCRIPTION OF The PREFERRED EMBODIMENT

Figure 1:
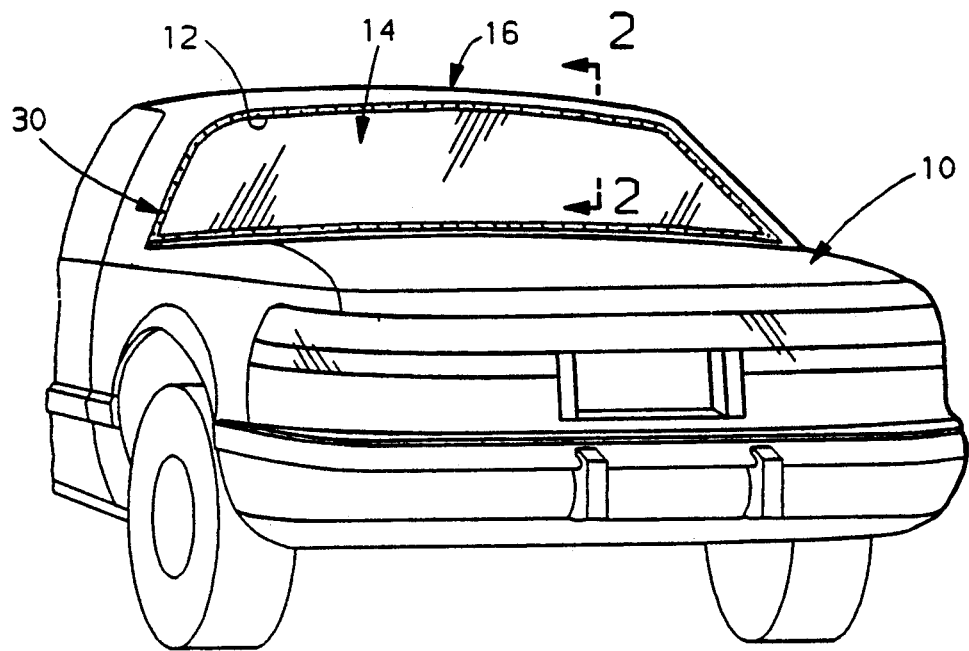
FIG. 1 is a rear perspective view of a vehicle body having a window molding according to the invention.

Referring to FIG. 1, a vehicle body structure 10 has an opening 12 which is closed by a window panel 14.

Figure 2:
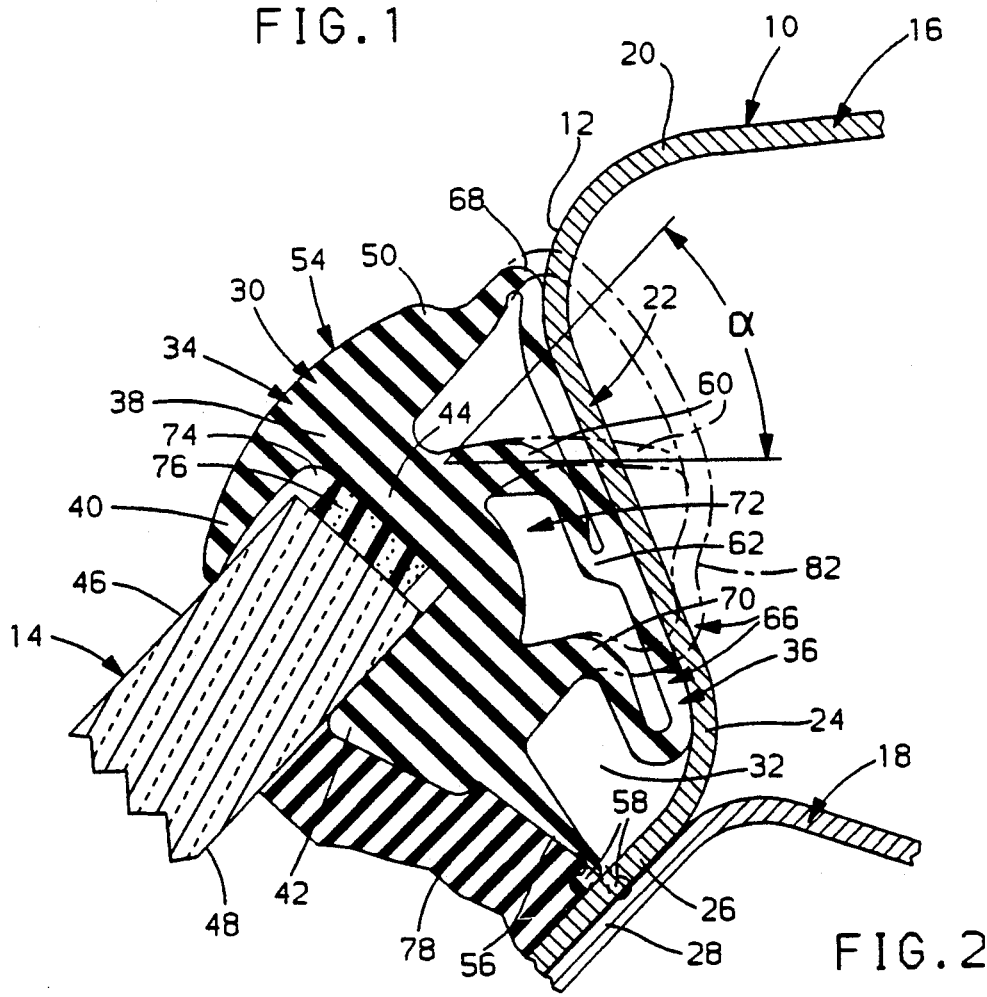
FIG. 2 is a sectional view taken in the direction of arrows 2—2 of FIG. 1.

Referring to FIG. 2, the body structure 10 has an outer panel 16 and an inner panel 18. The outer panel 16 has an outer appearance wall 20, and a flanged panel portion 22 including an inwardly angularly extending wall 24 which extends inward from the outer appearance wall 20 and also a parallel extending wall 26, which extends generally parallel to the window panel 14. A parallel extending wall 28 of the inner panel 18 engages and is secured to the parallel extending wall 26 of the outer panel 16. The flanged panel portion 22 defines the flanged window opening 12.

A bulbous window molding generally indicated at 30 retains the window panel 14 and conceals a space 32 between the window panel 14 and the inwardly angularly extending wall 24. Referring to FIG. 2, the molding 30 is a dual durometer co-extruded plastic material having a rigid high durometer portion 34 and a pliable low durometer portion 36. The rigid portion 34 has a C-shaped channel section 38 including a pair of spaced legs 40 and 42 spaced by a base wall 44. The spacing between the legs 40 and 42 is somewhat less than the thickness of the window panel so that the outer leg 40 will engage with an outer face 46 of the window panel 14 and the inner leg 42 will engage with an inner face 48 of the window panel 14. An exterior lip 50 of the rigid portion 34 forms a continuation of or is generally coplanar with the outer leg 40. It projects from the base wall 44 towards the outer appearance wall 20 to conceal a majority of the space 32 between the window panel 14 and the inwardly angularly extending wall 24. As shown in FIG. 2, the outer leg 40 and the exterior lip 50 combine to form a decorative outer portion 54 having a convexly curved outer surface. A spacer 56, which tapers and ends in a cylindrical portion 58, projects downward from the inner leg 42. The cylindrical portion 58 flexes to the side from its phantom position shown in FIG. 2 to its full line position shown in FIG. 2 when engaging the wall 26.

A rib or energy director 60 of the rigid portion 34 projects from the base wall 44 to a tip 62. The rib 60 is tapered and has a thickness which progressively decreases proceeding from the portion 34 toward its tip 62. The rib 60, in an undeformed or free state position, angles generally downward at an angle α of between 30° to 60°, preferably approximately 45°, relative to a plane containing the window panel 14 as shown in Phantom in FIG. 2. The rib 60 is deflectable or flexible from its phantom line position to its solid line position, as shown in FIG. 2.

The pliable portion 36 of the molding 30 has a deflectable web 66 including a pair of ends 68 and 70, which are integrally formed or bonded to the rigid portion at the exterior lip 50 and at the C-shaped channel section 38, generally at the interface of the inner leg 42 to the base wall 44. The web 66, the base wall 44 and the exterior lip 50 form a bulbous tubular portion 72. The tip 62 of the rib 60 is integral with or bonded to the web 66 between the two ends 68 and 70 to partition the bulbous tubular portion 72.

The molding 30 is applied to the window panel 14 prior to the window panel 14 being installed in the flanged window opening 12. The molding 30 is installed on the window panel 14 by spreading the legs 40 and 42 apart and pushing the molding 30 onto the edge of the window panel 14. In addition, a cavity 74 defined between the edge of the window panel and the base wall 44 preferably contains a suitable bonding and sealing material such as a butyl adhesive 76. Accordingly, it will be understood that the molding 30 is effectively attached to the window panel 14 by an interference fit of the legs 40 and 42 against the outer and inner faces 46 and 48 of the window panel 14. Furthermore, the presence of the bonding and sealing butyl adhesive 76 in the cavity 74 further attaches the molding 30 to the window panel 14.

The window panel and molding are installed in the window opening 12 by first placing a bead of curable urethane adhesive 78 on the wall 26. The window panel 14 and the molding 30 are loaded in flanged window opening 12, by holding the window panel 14 and the molding 30 parallel to the flanged window opening 12 as they are moved towards the flanged window opening 12. In its free state position, the pliable portion 36 is in the shape denoted by the phantom lines of FIG. 2. As the web 66 of the molding 30 engages the inwardly angularly extending wall 24, the web 66 of the pliable portion 36 compresses or deflects from its free state position, as shown by the phantom lines in FIG. 2, towards the base wall 44 of the molding 30. A lead-in edge 82 in the form of a dimple or indent on the web 66, guides or gives a direction for the web 66 to flow ensuring that the web 66 deforms into the space 32, between the window panel 14 and the inwardly angularly extending wall 24, and not onto the outer appearance wall 20.

When the portion of the web 66 that is bonded to the tip 62 of the rib 60 engages the inwardly angularly extending wall 24, the rib 60 which angles downward relative to the inwardly angularly extending wall 24 will deflect or flex downward towards the wall 26. The flexing downward of the rib 60 push/pulls the web 66 into the space 32 and ensures that the web 66 is retained in the space 32.

With the lead-in edge 82 of the web 66 and the rib 60 ensuring the bulbous tubular portion including the web 66 remains in the space 32, the molding 30 does not overlie the outer appearance wall 20, thereby the presence of the molding 30 is minimized, as shown by the solid lines in FIG. 2.

As seen in FIG. 2, the installation of the molding 30 and the window panel 14 onto the vehicle body structure 10 causes the web 66 of the pliable portion 36 to compressively sealingly engage the inwardly angularly extending wall 24. Accordingly, the bulbous tubular portion 72, which is impervious to airflow, fills at least a portion of the space 32 between the window panel 10 and the inwardly angularly extending wall 24. The space 32 is filled so that the volume of air communicating with the outside of the vehicle is substantially eliminated to prevent cavitational noise. The bulbous tubular portion 72 need not fill the entire space 32, but rather is effective if the bulbous tubular portion 72 fills the space 32 near the outer appearance wall 20 to block off the airflow communication between the outside of the vehicle and any remaining part of the space 32.

The cylindrical portion 58 of the spacer 56 flexes when it engages the parallel extending wall 26, where the spacer 56 spaces the window panel 14 from the flanged panel portion 22 and dams the curable urethane adhesive 78 from engaging the bulbous tubular portion 72 of the molding 30.

Referring to FIGS. 1 and 2, the rib 60, which is flexed, in addition biases the molding 30 towards the center of the flanged window opening 12. Since the whole perimeter of the flanged window opening 12 has a molding 30, the rib 60 assists in centering the window panel 14 in the flanged window opening 12. While an embodiment of the present invention has been explained, various modifications within the spirit and scope of the following claims will be readily apparent to those skilled in the art. While the inwardly angularly extending wall 24 is shown with an angle of greater than 90° relative to the outer appearance wall 20 and less than 90° to the parallel extending wall 26, the molding 30 would work similarly if the inwardly extending wall was perpendicular to both walls or angled in the other direction. The angle α by which the rib projects downward from the base wall can vary. The rib should be of an angle α that ensures that the rib will push/pull the web into the space and also bias the web into engagement with the inwardly extending wall.

The embodiments of the invention in which an exclusive property or privilege is claimed are defined as follows:

1. A motor vehicle window molding installation having a molding concealing a space between an inwardly extending wall of a flanged vehicle body panel and an edge of a window panel, and the edge of the window panel overlying an inwardly extending wall parallel to the window pane and which intersects the inwardly extending wall of the flanged vehicle body panel, said window panel being mounted on the parallel extending wall of the flanged vehicle body panel by a curable adhesive, the molding comprising:

- a first, high durometer, plastic material portion having a C-shaped channel section, and the C-shaped section having a pair of spaced apart legs which forcibly grip opposed faces of the window panel adjacent the edge of the latter and a base wall connecting the legs;
- a second, pliable, low durometer, plastic material portion co-extruded with said first portion and with the second pliable portion having a deflectable web including trailing and leading ends integral with said first portion, and the web and said first portion forming a bulbous tubular portion for engaging the inwardly extending wall of the vehicle body panel; and
- a rib integral with and extending between the base wall of the C-shaped channel section and the web for partitioning the bulbous tubular portion and for biasing the web outwardly away from said base of said C-shaped channel section, said web and said rib being deflectable inwardly toward said window pane by said inwardly extending wall of said flanged body panel and with the rib exerting a force to direct the web downwardly into the space between the window and the inwardly extending wall when the window is being mounted to the flanged vehicle body panel, said rib biasing the web into engagement with the flanged vehicle body panel when the window is mounted to the vehicle body panel whereby the web conceals the space between the flanged vehicle body panel and the window, said web being indented adjacent said leading end whereby said leading end guides the direction of movement of said web into said space between said window panel and said inwardly extending wall when the window panel and molding are being mounted to the vehicle body panel.

2. A motor vehicle window molding installation having a molding concealing a space between an inwardly extending wall of a flanged vehicle body panel and an edge of a window panel, and the edge of the window panel overlying a parallel extended wall intersecting the inwardly extending wall of the flanged vehicle body panel and mounted on the parallel extended wall of the flanged vehicle body panel by a curable adhesive, the molding comprising:

- a first high durometer plastic material portion having a C-shaped channel section and the C-shaped section having spaced apart outer and inner legs which forcibly grip opposed faces of the window panel and a base wall connecting the legs and the rigid portion having an exterior lip forming a continuation of the outer leg and projecting from the base wall towards the body panel for concealing the space between the inwardly extending wall of the body panel and the edge of window panel;
- a second pliable low durometer plastic material portion co-extruded with the first portion and with the second pliable portion having a deflectable web including ends integral with the exterior lip and the base wall, and the web, the exterior lip and the basewall forming a bulbous tubular portion for engaging the inwardly extending wall of the vehicle body panel; and
- a tapered rib integral with and extending between the base wall of the C-shaped channel section to the web so that the rib partitions the bulbous tubular portion, said tapered rib having a thickness proceeding from the base wall to said web which progressively decreases, said web having an indent adjacent its lead in end which is integrally connected to said base portion, said web and said rib being deflectable inwardly toward the edge of said window pane by said inwardly extending wall of said flanged body panel and with the rib exerting a force to direct the web and the lead in end guiding movement of the web into said space between the edge of the window panel and said inwardly extending wall when the window panel and molding are being mounted to the body panel, said rib biasing the web into engagement with the flanged vehicle body panel whereby the web conceals the space between the flanged vehicle body panel and the edge of the window panel.

3. A molding as in claim 2 wherein the rib in a undeformed state extends angularly downward from the base wall of the C-shaped channel section at an angle of between 30° and 60° relative to a plane containing the window panel.

4. A molding as in claim 2 wherein the rigid portion has a spacing means depending from the inner leg which engages the parallel extended wall for spacing the window panel from the latter wall and for providing a dam for said curable adhesive.

5. A molding as in claim 4 wherein the C-shaped channel section being has a bead of adhesive by which the C-shaped channel section is adhesively mounted onto the window panel.

6. A motor vehicle molding, as defined in claim 1, and wherein said rib has a thickness which progressively tapers proceeding from said base of said first portion toward said web.

* * * * *